US012060769B2

United States Patent
Gorbunov et al.

(10) Patent No.: US 12,060,769 B2
(45) Date of Patent: Aug. 13, 2024

(54) SAFETY VALVE FOR ELECTRICAL SUBMERSIBLE CENTRIFUGAL PUMPING SYSTEM

(71) Applicant: Joint Stock Company "Novomet-Perm", g. Perm (RU)

(72) Inventors: Dmitrii Valeryevich Gorbunov, g. Perm (RU); Michael Duncan, Dubai (AE); Artem Nikolayevich Musinskiy, g. Perm (RU); Viktor Georgievich Ostrovskiy, g. Perm (RU); Oleg Borisovich Yurov, g. Perm (RU); Maksim Olegovich Perelman, g. Perm (RU); Evgeniy Vyacheslavovich Poshvin, g. Perm (RU)

(73) Assignee: Joint Stock Company "Novomet-Perm", G. Perm (RU)

(*) Notice: Subject to any disclaimer, the term of this patent is extended or adjusted under 35 U.S.C. 154(b) by 240 days.

(21) Appl. No.: 17/625,398

(22) PCT Filed: Dec. 29, 2020

(86) PCT No.: PCT/RU2020/000670
§ 371 (c)(1),
(2) Date: Jan. 7, 2022

(87) PCT Pub. No.: WO2021/154117
PCT Pub. Date: Aug. 5, 2021

(65) Prior Publication Data
US 2022/0290537 A1 Sep. 15, 2022

(30) Foreign Application Priority Data
Jan. 31, 2020 (RU) .......................... RU2020104622

(51) Int. Cl.
*E21B 34/08* (2006.01)
*E21B 43/12* (2006.01)
(Continued)

(52) U.S. Cl.
CPC ............ *E21B 34/08* (2013.01); *E21B 43/128* (2013.01); *F04D 13/10* (2013.01);
(Continued)

(58) Field of Classification Search
CPC .... E21B 34/08; E21B 43/128; E21B 2200/06; F16K 17/025; F04D 13/10; F04D 15/0077; F04D 15/0245
See application file for complete search history.

(56) References Cited

U.S. PATENT DOCUMENTS 3,054,415 A * 9/1962 Baker .................. E21B 34/142
137/68.16
3,749,119 A * 7/1973 Tausch .................. E21B 34/08
137/461
(Continued)

FOREIGN PATENT DOCUMENTS

FR      2699958 A1 * 7/1994
RU      2250354 C2    4/2005
(Continued)

OTHER PUBLICATIONS

International Search Report and Written Opinion mailed Apr. 22, 2021, from International Application No. PCT/RU2020/000670, 8 pages.

*Primary Examiner* — Charles G Freay
(74) *Attorney, Agent, or Firm* — Millen, White, Zelano & Branigan P.C.; William F. Nixon

(57) ABSTRACT

Various implementations include a safety valve for mounting in a landing nipple in a wellbore. The safety valve includes a composite housing having a central passage, a
(Continued)

shutoff element and a control mechanism. The shutoff element includes a collet and a movable mandrel having stops located in the upper part. When the shutoff element moves axially, the stops extend through the composite housing to interact with a landing nipple stop surface. The control mechanism includes a spring-loaded tubular plunger having a ring piston on its upper outer surface and longitudinal openings in its lower part, the openings being configured to align with openings in the composite housing. The movable mandrel is connected to the safety valve head at the mandrel top and rests against the plunger at the mandrel bottom. The movable mandrel has grooves and shoulders on its outer surface, which allow for taking one of the fixed positions.

4 Claims, 3 Drawing Sheets

(51) Int. Cl.
*F04D 13/10* (2006.01)
*F04D 15/00* (2006.01)
*F04D 15/02* (2006.01)
*F16K 17/02* (2006.01)

(52) U.S. Cl.
CPC ...... *E21B 2200/06* (2020.05); *F04D 15/0077* (2013.01); *F04D 15/0245* (2013.01); *F16K 17/025* (2013.01)

(56) References Cited

U.S. PATENT DOCUMENTS

| | | | |
|---|---|---|---|
| 3,860,066 A * | 1/1975 | Pearce | E21B 34/101 166/72 |
| 4,441,558 A | 4/1984 | Welch et al. | |
| 7,967,074 B2 | 6/2011 | Lake et al. | |
| 2021/0025261 A1* | 1/2021 | Ostrovskiy | E21B 23/02 |
| 2022/0074290 A1* | 3/2022 | Al-Somali | F16K 1/18 |

FOREIGN PATENT DOCUMENTS

| | | |
|---|---|---|
| RU | 2362872 | 7/2009 |
| RU | 2516708 C2 | 5/2014 |
| RU | 2672898 | 11/2018 |
| RU | 2704078 C1 | 10/2019 |

* cited by examiner

SAFETY VALVE FOR ELECTRICAL SUBMERSIBLE CENTRIFUGAL PUMPING SYSTEM

CROSS REFERENCE TO RELATED APPLICATIONS

This application is a United States National Phase Patent Application of International Patent Application Number PCT/RU2020/000670, filed on Dec. 29, 2020, which claims the benefit of priority to RU Application No. 2020104622, filed on Jan. 31, 2020, the contents of which are incorporated by reference herein in their entireties.

FIELD OF THE INVENTION

The invention relates to the oil industry and can be used for oil production.

BACKGROUND OF THE INVENTION

A the safety valve is known in the art [U.S. Pat. No. 7,967,074, published on Jan. 28, 2011], the safety valve comprising a housing with a central longitudinal passage, a shutoff element with retractable dies in the upper part of the housing, a connecting element, channels for fluid flow, valve elements, and a sleeve moving as affected by springs and a landing nipple. Such safety valve is mounted inside a failed tubing mounted subsurface safety valve, makes it permanently fully open and uses its hydraulic control line. The disadvantage of the valve is that it cannot be used independently, without the failed main (tubing mounted) valve, the hydraulic line of which it uses.

The closest prior art solution for the claimed device is a safety valve for an electrical submersible centrifugal pumping system [RU 2516708, IPC E21B34/06, published on May 20, 2014]. The valve is controlled by differential pressure on both sides and is located in the landing nipple. It comprises a composite housing with a central passage, a packer, a shutoff element comprising a movable mandrel and a collet having blades and a head, a control mechanism for the shutoff element, a rod with openings and a circular groove. The rod has a check valve cage in the upper part, a ring piston in the middle part and a control mechanism comprising a stepped ring piston at the bottom end, the control mechanism being pressed with a nut and equipped with a cup with a collar forming a movable connection with an extension connected to the composite housing provided with a separating washer and a lower adapter in the connection area. The stepped ring piston has a sleeve forming a movable connection in the boring of the lower adapter and a ring chamber with an extension, the chamber hydraulically connected with the axial channel of the sleeve by means of a drain opening. The cavities above the ring piston and above the collar are hydraulically connected to the cavity under the packer by means of openings. The cavity of the ring chamber above the separating washer is connected to the axial channel of the rod by means of an opening. Further, the shaped nut is connected to the housing of the bypass valve having a landing surface at the end part facing the landing seat of the lower adapter, in the axial channel of which a seat with a spring-loaded ball valve is mounted. The collet is installed inside the composite housing. The prior art safety valve is used to shut off the wellbore during workover procedures without killing the well.

The disadvantages of the prior art safety valve include the design complexity due to the presence of two ball valves and three springs, which reduces the valve reliability, and the constraints related to using the valve in slim wells.

SUMMARY OF THE INVENTION

The object of the present invention is to provide a reliable automatic safety valve for shutting off the inlet channel of the electrical centrifugal pump from well fluid coming from the annulus when the electric motor is disabled, and ensure uninterrupted supply of well fluid when the electric motor is enabled, with the possibility of using such safety valve in slim wells.

The technical effect is achieved by the design of an electrical submersible pumping system safety valve fora landing nipple. The valve comprises a composite housing having a central passage and through grooves, a shutoff device including a movable tubular element, a fixing socket, and a control mechanism including a spring and a plunger. According to the invention, the shutoff device comprises stops located in an upper part of the movable tubular element and extendable through composite housing through grooves under the axial movement of the shutoff device. The control mechanism comprises a spring-loaded tubular plunger having a ring piston on an upper outer surface of the tubular plunger and longitudinal openings in a lower part of the tubular plunger configured to align with similar openings in the composite housing. The movable tubular element is connected to a head of the safety valve at a tubular element top and rests against the plunger at a tubular element bottom.

In order to provide a fixed position inside the composite housing when mounting the safety valve in the landing nipple, the movable tubular element comprises notches and protrusions on an outer surface of the tubular element.

Besides, the stops are pressed by leaf springs when the valve is run in the well.

The composite housing also comprises a seal housing having a through opening for fluid inlet and an outer elongated groove accommodating the sealing unit.

The technical effect is achieved by the fact that, when the electrical submersible pump is running, reduced pressure compared to that of the annulus is created in the inner cavity of the safety valve, and the plunger is displaced due to the resulting differential pressure. In this case, the longitudinal through openings at the bottom of the plunger align with similar openings in the composite housing, thus ensuring passage of the well fluid through them to the inlet of the electrical submersible pump. When the pump is off, the pressure in the annulus and in the inner cavity of the safety valve is equalized, the spring is released and makes the plunger to displace towards the movable tubular element; as a result, the longitudinal through openings in the plunger and the housing fail to align, and the flow of well fluid into the pump stops.

BRIEF DESCRIPTION OF THE DRAWINGS

The invention is illustrated by the drawings, where.

DETAILED DESCRIPTION OF THE INVENTION

Figure 1:
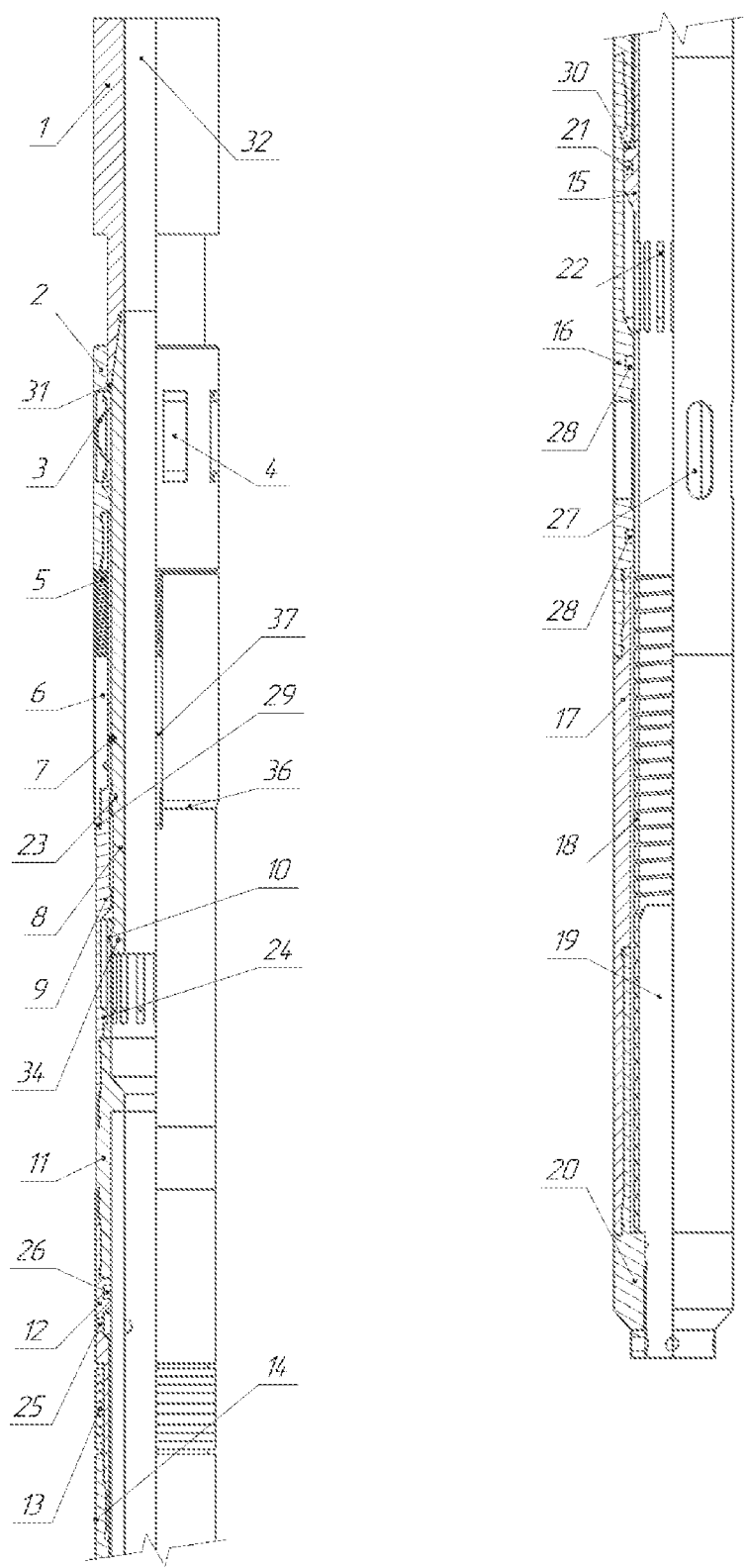
FIG. 1 shows the safety valve in the longitudinal section.

The safety valve (FIG. 1) comprises head 1, lock housing 2, leaf spring 3 pressing stops 4, shifting tool with spring 5 and pins 6 arranged in groove 37 on the outer side of lock housing 2, lock balls 7, movable tubular element 8, release housing 9, fixing socket 10, stop housing 11, seal housing 12 with sealing unit 13, adapter housing 14, valve housing 16, plunger 15, spring housing 17, spring for moving the plunger 18, guide rod 19, base 20, collar 21, through openings 22 in the plunger 15, external notch 23 in the movable tubular element 8, protrusion 24 on the release housing 9, inlet opening 25, sleeves 26, longitudinal through opening 27 in the valve housing 16, sleeves 28, ring piston 30, and stop surface 36 of the lock housing 2.

Head 1 has stop surface 31 resting against stops 4 at the end of the outer diameter from the side of movable tubular element 8. Head 1 has a threaded connection with movable tubular element 8 and is sealed by means of a sealing sleeve located in the end groove on the inner surface of head 1. Through central passage 32 extends along the safety valve starting from head 1. On the outer surface of movable tubular element 8, there are notch 33 (FIG. 3), notch 23 and protrusion 34 (FIG. 1) designed to secure the tubular element in one of the positions using fixing socket 10 and lock balls 7.

Inside the central passage 32 of the composite housing, between movable tubular element 8 and spring 18, there is hollow tubular plunger 15 configured for axial movement. The movement of plunger 15 is limited by spring 18 on the one side and by resting against the lower side of movable tubular element 8 on the other side. Plunger spring 18 is mounted on guide rod 19 connected to base 20 with a thread. In the upper part, on the outer surface of plunger 15, ring piston 30 is arranged with a groove for sealing sleeve 21 resting against valve housing 16. In the lower part of plunger 15, a series of longitudinal through openings 22 is formed.

Movable tubular element 8 with fixing socket 10 secured from below and having in its upper part stops 4 extendable through the rectangular grooves of lock housing 2 forms the shutoff device of the safety valve.

Figure 2:
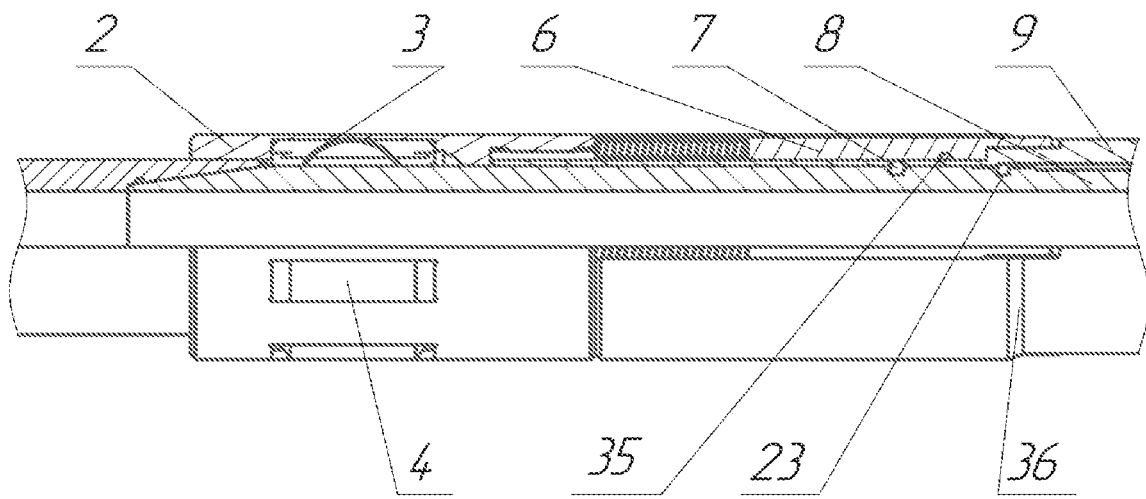
FIG. 2 shows the safety valve being lowered into the well in the longitudinal section.

When running in the well, stops 4 are held by leaf springs 3, and after the procedure is completed, springs 3 interact with the stop surface of the landing nipple and are extended. Lock housing 2 rests against the shifting tool pins 6 from below through the shifting tool springs 5. On the inner surface of the shifting tool pins 6, there is bore 35 (FIG. 2) for the lock ball 7, and stop surface 29 on the outer end of the shifting tool pins 6. From below, the shifting tool pins 6 rest against release housing 9 which has protrusion 24 (FIG. 1) on the lower surface to secure fixing socket 10. Then release housing 9 has a threaded connection with stop housing 11, which, in turn, has a threaded connection with seal housing 12 having through opening 25 for fluid inlet. On the outer surface of seal housing 12, an elongated groove is formed for sealing unit 13, and on its inner surface a bore with sleeve 26 is formed. Seal housing 12 has a threaded connection with adapter housing 14 with valve housing 16 screwed onto its lower end. The valve housing has longitudinal through opening 27 the shape of which is similar to the shape of longitudinal through openings 22 in plunger 15. On the lower surface of valve housing 16 bores for sealing sleeves 28 are formed. Valve housing 16 has a threaded connection with spring housing 17 connected to base 20.

The device operates as follows.

When running the unit in the well (FIG. 2), the safety valve is mounted below the electrical submersible pump (not shown). Movable tubular element 8 is blocked by release housing 9 using lock balls 7 with stops 4 hidden in lock housing 2 and held there by leaf springs 3. At this time, shifting tool pins 6 are located to the right of stop surface 36, and therefore, as soon as the safety valve falls onto the stop surface of the packer nipple, the shifting tool pins 6 are fully engaged, thus ensuring timely mounting of the valve.

Figure 3:
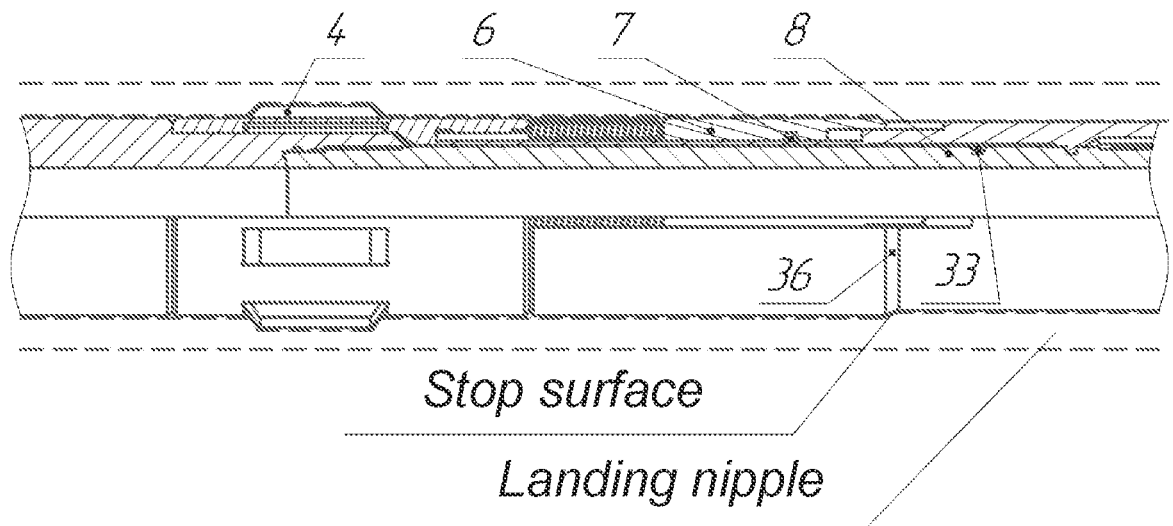
FIG. 3 shows a schematic of the safety valve mounting inside the landing nipple.

When the safety valve reaches the setting depth, and the shifting tool pins 6 touch the surface on the packer landing nipple with stop surface 29, the four shifting tool pins 6 are simultaneously displaced, and lock balls 7 extend from bore 33 of movable tubular element 8. Then, under the weight of the tubing string, movable head 1 connected to tubular element 8 moves downward, while the head stop surface 31 pushes stops 4 out, and movable tubular element 8 is fixed in fixing socket 10 by means of notch 23. The safety valve is fixed at the set depth with its stop surface 36 resting against the stop surface of the nipple (FIG. 3). Sealing unit 13 isolates well fluid present below the sealing unit (FIG. 4).

After the safety valve is installed, three isolated volumes are formed: the inner area, the outer area and the area below the sealing unit (FIG. 3). The pressures of the outer area and the inner area are designated as P1 and P2, respectively.

Figure 4:
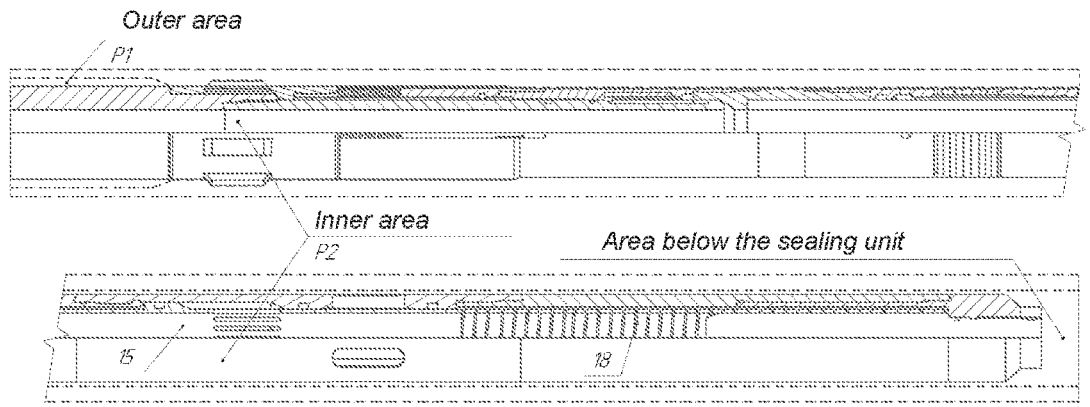
FIG. 4 shows a diagram of isolated volumes of fluid when the motor is disabled.

If the pump is not running and P1=P2, then plunger 15 is located at the top under the action of compression force of plunger spring 18 (the safety valve is closed), and the oil, gas and water mixture from the area below the sealing unit cannot enter the inner cavity of the safety valve (FIG. 4).

Figure 5:
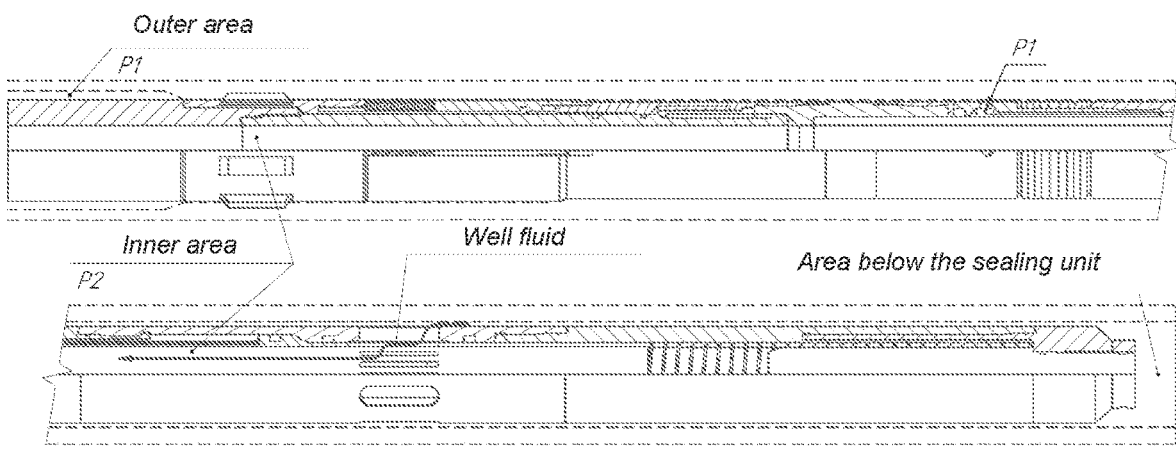
FIG. 5 shows a scheme of fluid movement when the electric motor is running.

If the pump is running, then P1>P2 and, due to the differential pressure, well fluid from the outer area, moving towards a lower pressure area, enters through opening 25 into the cavity formed by the inner surface of seal housing 12, the outer surface of plunger 15, the surfaces of sleeve 26 and ring piston plunger 30 (FIG. 1), and causes plunger 15 to move downward (FIG. 5). Longitudinal through openings 22 align with similar openings 27 in valve housing 16. The valve switches to the open position in which the oil, gas and water mixture from the area below the packer can enter the inner area of the safety valve, and then flow into the pump, thus ensuring its continuous supply.

When removing the safety valve, an upward pull with a force equivalent to the weight of the tubing string is required.

Thus, the use of the safety valve increases operational reliability of the electrical submersible pump by ensuring uninterrupted supply of well fluid when the electric motor is running and allowing to shut off the supply of well fluid automatically when the pump is not running.

The design of the claimed safety valve allows it to be used in wells of any diameters, including slim wells. For this it is necessary to reduce the size of the safety valve in proportion to the well diameter.

The invention claimed is:

1. An electrical submersible pumping system safety valve for a landing nipple, the valve comprising:
   a composite housing having a central passage and through grooves,
   a shutoff device including a movable tubular element and a fixing socket receiving the movable tubular element, and
   a control mechanism comprising a spring and a plunger, wherein
   the safety valve is characterized in that the shutoff device comprises stops, said stops being arranged to be pressed against the movable tubular element and, when the shutoff device moves axially along the composite housing, to extend through the through grooves of the composite housing, the plunger of the control mechanism is a tubular plunger loaded by the spring of the control mechanism, the plunger has a ring piston on an upper outer surface of the tubular plunger and longitudinal openings in a lower part of the tubular plunger, the openings being configured to align with similar openings in the composite housing, and the movable tubular element connected to a head of the safety valve at a tubular element top and rests against the plunger at a tubular element bottom.

2. The safety valve according to claim 1, wherein the movable tubular element comprises notches and protrusions provided on an outer surface of the movable tubular element, wherein the notches and protrusions are configured to fix the position of the movable tubular element inside the composite housing.

3. The safety valve according to claim 1, wherein the stops are pressed by leaf springs.

4. The safety valve according to claim 1, wherein the composite housing comprises a seal housing having a through opening for fluid inlet and an outer elongated groove accommodating a sealing unit.

* * * * *